Patented Feb. 4, 1947

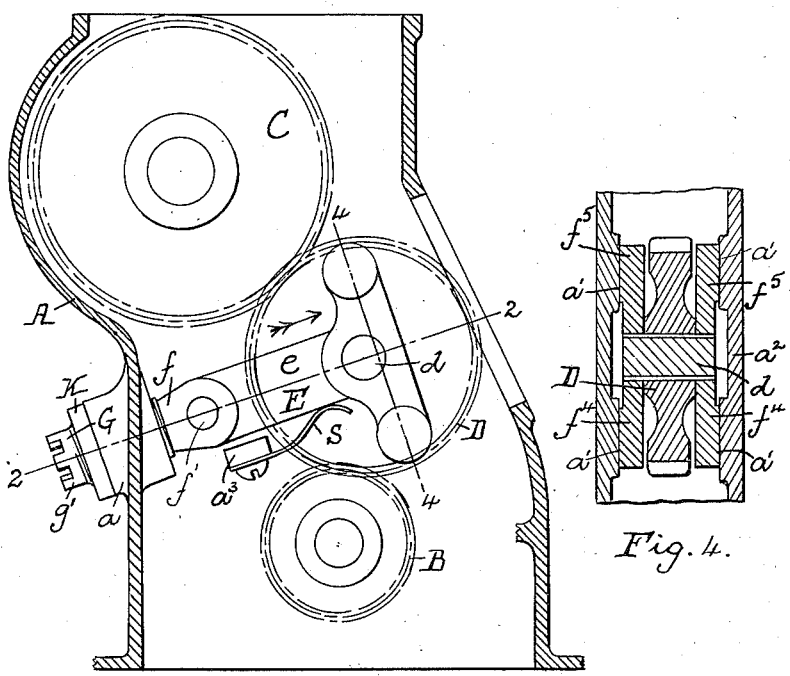

2,415,278

UNITED STATES PATENT OFFICE 2,415,278

SPUR GEAR DRIVE TRANSMISSION

Hubert Noel Charles and Clarence F. Nossiter, Birmingham, England, assignors to The Austin Motor Company, Limited, Birmingham, England Application April 4, 1944, Serial No. 529,478
In Great Britain March 26, 1943

5 Claims. (Cl. 74—397)

The invention relates to spur gear drive transmission and is especially applicable to such drive transmission when applied to the drive from an engine crank shaft to the respective cam shaft. In this latter case difficulty has been experienced in producing a spur wheel drive which is sufficiently silent, there being usually a certain amount of clatter caused by back-lash resulting from wear and by other causes such as inaccuracy of centreing. The object of this invention is to provide a spur wheel drive transmission in which the above objection is eliminated or greatly reduced.

A spur gear drive, according to this invention, comprises a driving spur wheel on the driving member, for instance the crank shaft of an internal combustion engine, and a driven spur wheel on the driven member, for instance the cam shaft of the engine. These two spur wheels do not mesh with each other but each is in mesh with an intermediate or idle wheel which is mounted for rotation in relation to a part which can be adjusted towards the driving and driven spur wheels but is free to adjust itself, in the plane of the wheels, in a direction substantially parallel to a line joining the axes of the driving and driven wheels.

The said part, in relation to which the idle wheel is mounted, may be one end of a link which may be of the tension or compression type, that is to say it may be a link capable of pulling the idle wheel into mesh with the other two spur wheels, or it may be a link which can press the idle wheel into mesh with the other two wheels.

With the above construction the idle wheel is, in effect, a floating wheel, and, by suitable adjustment of the link anchorage, the teeth of the idle wheel can be made to exert equal and even pressure on the teeth of the other two wheels. Any undue back-lash which may develop may be readily taken up by adjustment of the link anchorage.

A convenient embodiment of the invention is described with reference to the accompanying drawing, in which:

Figure 1 is a view, partly in transverse vertical section and partly in end elevation, of a spur gear transmission, for driving the cam shaft of an internal combustion engine, arranged according to the invention.

Figure 2 is a view of the transmission partly in plan and partly in sectional plan, the section being taken through the entire device on a plane corresponding in position to that of line 2—2 of Fig. 1.

Figure 3 is a sectional plan view, to an enlarged scale, of the adjusting means.

Figure 4 is a section taken on the line 4—4, of Figure 1.

Figure 5 is a side elevation showing a modification in somewhat diagrammatic form.

Referring to Figures 1 to 4, A indicates the gear casing of an internal combustion engine, B a spur wheel mounted on the engine crank shaft, and C a spur wheel mounted on the cam shaft. It will be seen that the wheels B and C do not engage directly each with the other; but both are engaged by an intermediate or idle wheel D which is turnably mounted on a pin $d$ carried by bifurcations $e$ $e$ of a link E which has, at its other end, an eye $e'$. F is a bolt having bifurcations $f$ $f$ at its forward end through which passes a pin $f'$, the latter also passing through the eye $e'$ of the link E. Thus the link E and the bolt F are hinged together. The bolt passes rearwardly through a hollow cylindrical housing G which has an external screw thread adapted to screw into a screwed hole in a boss $a$ of the casing A. The bolt F has a reduced screw-threaded portion $f^2$ at its rearward or outer end leaving a shoulder $f^3$ at the forward end of the thread.

A nut $h$ is screwed on the reduced screw-threaded portion $f^2$ and, when the nut is tightened up, it clamps a washer H against the shoulder $f^3$ on the bolt, and the washer is adapted to engage, as a turning fit, against an internal shoulder $g$ of the housing G. In this way the bolt F is located in the housing G and is moved endwise therewith, but is not turned thereby. The housing is provided with castellations $g'$ at its rearward or outer end, and, when the housing is turned to screw it rearwardly, by means of the castellations, it causes the link E to draw the idle wheel D more closely into mesh with the teeth of the other two wheels until the teeth are in proper engagement. K is a lock nut to lock the housing G after adjustment.

In order to keep the idle wheel in the plane of the other two wheels and prevent it tilting in relation thereto as it would tend to do while the housing was being turned or if helical teeth were provided on the wheels, as is preferred, each bifurcation $f$ has a downward arm $f^4$ and an upward arm $f^5$ and these have outwardly presented faces adapted to engage against bearing faces $a'$ on the inner surface of the casing A and of a cover plate $a^2$.

It will be seen that the mounting of the idle wheel on the link leaves it free to adjust itself in a direction substantially parallel to a line joining the axes of the wheels B and C.

As the weight of the idle wheel D would cause it to press on the teeth of the wheel B, oil noise would result at starting and, to avoid this, a light leaf spring S is anchored to the casing at $a^3$ and is adapted to bear upwardly against the under side of the link E and balance the weight of the idle wheel.

The device is particularly suitable for a nodal drive to the cam shaft of an ordinary engine with cylinders in line, because the cam shaft driving gear can conveniently be situated just in front of the fly-wheel close to the principal torsional node.

Referring to Figure 5 the idle wheel D is mounted on a pin $d$ which is allowed an up-and-down movement in a slot $m$ of a lever arm M which is pivoted at $m'$ to a fixed part. The lever is pressed by an adjustable cam N to bring the teeth of the idle wheel into proper engagement with the wheels B and C.

The number of teeth on the idle wheel has, of course, no reference to the gear ratio; but it should be such as to secure a roving tooth effect, that is to say it should have a tooth number differing by an odd number from those of the other two wheels, whereby it is ensured that any two teeth on different wheels inter-engage only at relatively long intervals.

The idle wheel may be made of non-metallic substance, if desired, such as plastic material or combined fabric and composition, or it may be made of other material used for this purpose such as hide or gear metal.

Having fully described our invention what we claim and desire to secure by Letters Patent is:

1. A spur gear drive comprising a driving wheel, spur teeth on said driving wheel, a driven wheel, spur teeth on said driven wheel which do not mesh with said spur teeth on said driving wheel, an intermediate wheel, spur teeth on said intermediate wheel, a link disposed in or near the plane of the said wheels and on a line substantially at right-angles to a line joining the axes of the said driving and driven wheels, means for rotatably supporting said intermediate wheel on one end of said link, the other end of said link being pivotally connected to a part which is adjustable towards and from said line joining the axes of said driving and driven wheels to bring the teeth of said intermediate wheel into proper engagement with the teeth of said driving and driven wheels, and guide means to keep the idle wheel in the plane of the driving and driven wheels.

2. A spur gear drive comprising a driving spur wheel and a driven spur wheel which do not mesh together, an idler spur wheel engaging both the driving and driven wheels, said idler spur wheel having a pitch line diameter greater than the shortest distance between the pitch lines of the driving and driven wheels, and said idler wheel being rotatably mounted on one end of a link, a member adjustable in relation to a fixed part in a direction towards or from a line joining the axes of the driving and driven wheels and said member pivotally connected to the other end of the said link.

3. A spur gear drive comprising a driving spur wheel and a driven spur wheel which do not mesh together, an idler spur wheel engaging both the driving and driven wheels, said idler spur wheel having a pitch line diameter greater than the shortest distance between the pitch lines of the driving and driven wheels, means on which said idler wheel is mounted for rotation, said means being adjustable towards both the driving and the driven spur wheels and said idler wheel being free to adjust itself in the plane of the wheels in a direction substantially parallel to a line joining the axis of the driving and driven wheels, the axes of the driving and driven wheels disposed at different levels and spring means to counterbalance the weight of said idler wheel.

4. A spur gear drive comprising a driving spur wheel and a driven spur wheel which do not mesh together, an idler spur wheel engaging both the driving and driven wheels, said idler wheel having a pitch line diameter greater than the shortest distance between the pitch lines of the driving and driven wheels, means on which said idler wheel is mounted for rotation, said means being adjustable towards both the driving and the driven spur wheels and said idler wheel being free to adjust itself in the plane of the wheels in a direction substantially parallel to a line joining the axis of the driving and driven wheels, and guide means to keep the idler wheel in the plane of the driving and driven wheels.

5. A spur gear drive comprising a driving spur wheel and a driven spur wheel which do not mesh together, an idler spur wheel engaging both driving and driven wheels, said idler spur wheel having a pitch-line diameter greater than the shortest distance between the pitch-lines of the driving and driven wheels, said idler wheel being mounted for rotation, screw operated means whereby the axis of the idler wheel can be moved toward both the driving and the driven spur wheels, and said idler wheel being free to adjust itself in the plane of the wheels in a direction substantially parallel to a line joining the axes of the driving and driven wheels.

HUBERT NOEL CHARLES.
CLARENCE F. NOSSITER.

REFERENCES CITED

The following references are of record in the file of this patent:

UNITED STATES PATENTS

| Number | Name | Date |
|---|---|---|
| 2,248,384 | Redin | July 8, 1941 |
| 2,397,777 | Coleman | Apr. 2, 1946 |

FOREIGN PATENTS

| Number | Country | Date |
|---|---|---|
| 410,809 | British | May 23, 1934 |